US012751884B1

(12) United States Patent
Jansen

(10) Patent No.: US 12,751,884 B1
(45) Date of Patent: Oct. 6, 2026

(54) SMART STRETCHING APPARATUS

(71) Applicant: Ronny Jansen, Jersey City, NJ (US)

(72) Inventor: Ronny Jansen, Jersey City, NJ (US)

( * ) Notice: Subject to any disclaimer, the term of this patent is extended or adjusted under 35 U.S.C. 154(b) by 0 days.

(21) Appl. No.: 19/417,235

(22) Filed: Dec. 11, 2025

(51) Int. Cl.
*A61H 1/02* (2006.01)

(52) U.S. Cl.
CPC ......... *A61H 1/0218* (2013.01); *A61H 1/0244* (2013.01); *A61H 2201/0149* (2013.01); *A61H 2201/0192* (2013.01); *A61H 2201/1215* (2013.01); *A61H 2201/1623* (2013.01); *A61H 2201/1633* (2013.01); *A61H 2201/1635* (2013.01); *A61H 2201/501* (2013.01); *A61H 2201/5048* (2013.01); *A61H 2201/5056* (2013.01); *A61H 2201/5061* (2013.01); *A61H 2201/5069* (2013.01)

(58) Field of Classification Search
CPC .................... A61H 1/02; A61H 1/0218; A61H 1/0237–0244; A61H 1/0266; A61H 1/0274; A61H 1/0281; A61H 1/0292; A61H 2001/0203–0207; A61H 2001/0248; A61H 2201/0149; A61H 2201/0157; A61H 2201/0173–0176; A61H 2201/0192; A61H 2201/12–1215; A61H 2201/1238–1246; A61H 2201/1623; A61H 2201/1633–1635; A61H 2201/164–1642; A61H 2201/1676; A61H 2201/5007–501; A61H 2201/5035; A61H 2201/5056; A61H 2201/5061; A61H 2201/5069–5071; A61H 2203/0425
See application file for complete search history.

(56) References Cited

U.S. PATENT DOCUMENTS 5,277,681 A * 1/1994 Holt .......................... A61H 1/02 482/133
5,421,801 A 6/1995 Davies, III et al.
(Continued)

FOREIGN PATENT DOCUMENTS

CN 221787192 U 10/2024
KR 102017211 B1 9/2019

OTHER PUBLICATIONS

"MirrorFit-Somatic Yoga Workout" App Store.https://apps.apple.com/lv/app/mirrorfit-somatic-yoga-workout/id6470841460 (Accessed Oct. 16, 2025).

*Primary Examiner* — Rachel T Sippel
(74) *Attorney, Agent, or Firm* — Nieves IP Law Group, LLC; Peter A. Nieves

(57) ABSTRACT

A smart stretching apparatus contains a main body having a seat and a backrest, which can be placed on a couch or other soft surface. A motorized hinge having an angle sensor is adjoined to the seat, and a detachable lever arm extends from the motorized hinge. The lever arm has integrated handles that have force sensors. A mobile application commands the motorized hinge to rotate the lever arm towards and away from the seat based on data collected from the angle sensor and a force sensor in the integrated handles. The seat can also be adjoined to a bracket mechanism, which can be secured to a seat base. The seat base has an electric motor which controls crank assemblies having a horizontally oriented extension bar. The electric motor is also controlled by the mobile application. This allows the user to stretch their lower body in a standalone apparatus.

22 Claims, 20 Drawing Sheets

(56) References Cited

U.S. PATENT DOCUMENTS

| | | | | |
|---|---|---|---|---|
| 10,143,885 | B2 | 12/2018 | DuMee | |
| 12,296,223 | B1 | 5/2025 | Robinson | |
| 2013/0225378 | A1* | 8/2013 | Burek | A63B 26/00 482/142 |
| 2017/0136296 | A1 | 5/2017 | Barrera et al. | |
| 2019/0111299 | A1* | 4/2019 | Radcliffe | A61H 1/0274 |
| 2021/0228942 | A1 | 7/2021 | Erkkiläet al. | |
| 2022/0047442 | A1* | 2/2022 | Taylor | A61H 1/0218 |
| 2022/0387243 | A1 | 12/2022 | Guenther | |
| 2023/0000710 | A1* | 1/2023 | Hung | A61H 1/005 |
| 2023/0233396 | A1 | 7/2023 | Patel | |

* cited by examiner

Apparatus Folded

SMART STRETCHING APPARATUS

FIELD OF THE INVENTION

Embodiments of the present disclosure relate to a smart stretching apparatus, particularly a main body connected to a lever arm by a motorized hinge. The lever arm contains sensors which measure the force and motion of a user, and the motorized hinge has a sensor which measures angle of the lever arm. The sensors can communicate measured data to a mobile application on the user's personal cell phone device. The user can control the smart stretching apparatus through a mobile application, which reviews data from the sensors and commands the motorized hinge to reposition the lever arm, if needed.

SUMMARY OF THE INVENTION

Embodiments of the present disclosure provide a smart stretching apparatus. Briefly described, the present smart stretching apparatus contains a main body, having a seat and a backrest, wherein the seat and the backrest have a smooth back surface. The seat is adjoined to the backrest by a hinge joint with a locking mechanism, and the backrest has at least one set of grips, wherein each grip extends from a right side and a left side of the backrest. A motorized hinge is adjoined to a front edge of the seat, and a detachable lever arm extends from the motorized hinge. The lever arm is comprised of at least one hinge joint with a locking mechanism, at least one set of integrated handlebars secured to a vertical guide rail, a force sensor for measuring a downward force applied to the lever arm by a user, a microcontroller for gathering data from the force sensor, and a power connector for obtaining power from a power source. The motorized hinge is comprised of an angle sensor for measuring an angle of the lever arm, and a strain gauge for detecting a force applied to the integrated handlebars on the lever arm. A mobile application communicates and controls the motorized hinge.

In another embodiment, the smart stretching apparatus has a bracket mechanism adjoined to the bottom of the seat. The smart stretching apparatus can then be secured to the top of a seat base. The seat base has a bracket which complements the bracket mechanism adjoined to the seat. The seat base further has a height control lever, at least one crank assembly with a hinge force sensor and a horizontal extension bar, an electric motor, a power plug, and a pedestal base. The mobile application is configured to communicate and control the electric motor to rotate the crank assembly.

Other features of the present invention will be or become apparent to one having ordinary skill in the art upon examining the following drawings and detailed description. It is intended that all such additional features included in this description be within the scope of the present invention and protected by the accompanying claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DRAWINGS

Embodiments of the present disclosure provide a smart stretching apparatus that enables comprehensive, full body stretching from any seat surface. Current stretching devices are either standalone or only enable certain stretches. The smart stretching apparatus is multifunctional and allows users to perform the eleven most important stretches for overall flexibility and wellness using a single, easy-to-use device. It allows for the unique ability to be placed on a couch or any flat surface, including on a chair base, and guides the user through pre-programmed routines, tracks performance, and progress.

Stretching devices can help users stretch muscle groups while keeping proper form. However, existing devices lack the means to stretch the eleven most important stretches or are not adaptable to common household spaces. Users must therefore purchase multiple stretching tools to improve their overall flexibility or purchase a large stretching device that consumes large amounts of space in their home. Moreover, while these stretching devices aim to promote proper form, they do not provide a comprehensive mobile application that can control the stretching device and record data from sensors within the device.

A brief description of a smart stretching apparatus is provided herein to better reflect various features of smart stretching devices. The present smart stretching apparatus possesses a seat with a lever arm that extends from a motorized hinge on the seat. The motorized hinge is controlled wirelessly by a mobile companion application, wherein the user can focus on their body positioning while the smart stretching apparatus enables deeper stretching. Additionally, the user can place the smart stretching apparatus on their couch or on a chair base. The unique, sofa-based setup allows users to pair their stretching routine with entertainment, transforming a potentially monotonous activity into a productive and enjoyable use of their leisure time. Conversely, when the smart stretching apparatus is placed on a chair base, the user can continue to work on their computers or engage in other seated activities while stretching.

Figure 1:
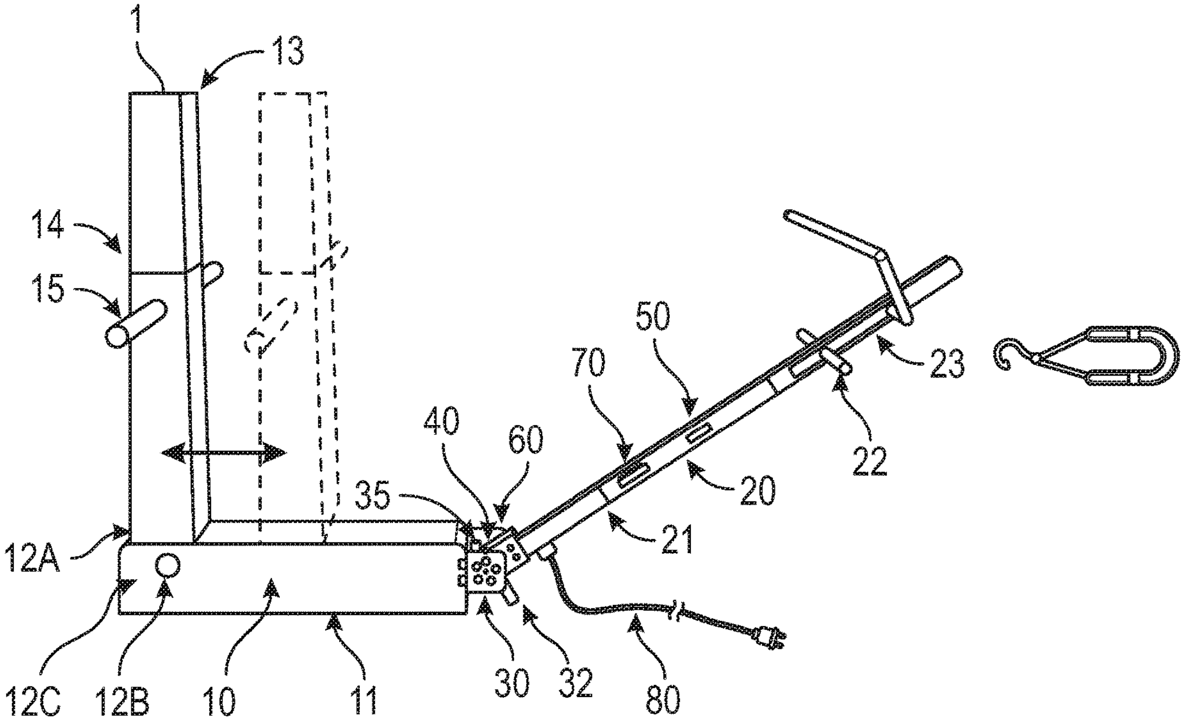
FIG. 1 shows a perspective view of the side of the smart stretching apparatus, in accordance with an embodiment of the present disclosure. The backrest can move positions, and the foot bar can be interchanged with a foot strap.

FIG. 1 is a perspective view of the side of the smart stretching apparatus, in accordance with an embodiment of the present disclosure. Specifically, the smart stretching apparatus 1 has a main body 10, with a seat 11 and a backrest 13, each having a back surface and a top surface. The main body 10 can be constructed from lightweight materials including molded foam, and the back surface of the seat 11 and backrest 13 can be made of smooth and non-abrasive materials allowing the main body 10 to be placed on a sofa without harming the fabric. Alternatively, fastening materials can be adhered to the back surface of the backrest 13 and seat 11 to secure the main body in it s place. The seat 11 has a flat top surface, which enables a user to sit in three directions including forwards, backrest left, and backrest right. In some embodiments, the seat 11 can have handles extending from a right side and a left side of the seat for added user support. One of ordinary skill in the art would appreciate that while the handles could be implemented in any embodiment of the present disclosure, the handles extending from the seat 11 is not required.

In some embodiments, the seat 11 is connected to the backrest 13 with a hinge joint 12A and a locking mechanism 12B, allowing the angle and positioning of the backrest 13 to be adjusted. One of ordinary skill in the art will appreciate that other mechanisms for adjoining a seat to a backrest can be used. The hinge joint 12A is configured to be any hinge joint including hinges with a spring-loaded button or a cam-locking lever, enabling the angle of the backrest 13 to be adjusted. As shown in FIG. 1, the locking mechanism 12B can be any locking mechanism including a spring-loaded pull pin, which locks into a sliding mechanism 12C in the seat 11. This allows the backrest 13 to be repositioned on the top surface of the seat 11 by unlocking, sliding, and re-locking the backrest 13. This thereby adjusts the seat surface to accommodate users of different body sizes.

The backrest 13 can have a hinge joint 14 with a locking mechanism on its back surface that allows the backrest of the seat to be folded for easy storage. The hinge joint 14 is configured to be any hinge joint including hinge joints with a spring-loaded button or a cam-locking lever. The backrest 13 can also have grips 15 extending from a right side and a left side of the backrest.

According to some embodiments, a motorized hinge 30 is adhered to the main body 10 on the seat 11. The motorized hinge 30 can be any electromechanical pivot mechanism, including a motorized gear hinge. Additionally, the motorized hinge 30 has a self-locking mechanism 32, which can be any self-locking mechanism common in the art. In some embodiments, the motorized hinge 30 is positioned to the front-center of the seat 11 and a detachable lever arm 20 extends from the motorized hinge 30 away from the main body 10. In an exemplary embodiment, when the motorized hinge 30 has gears, it can contain a self-locking worm gear drive, which can provide power to automatically lift, lower, and securely hold the lever arm 20 at any angle as commanded by the mobile application 200. According to some embodiments, the motorized hinge 30 has an emergency stop switch 35, which is configured to be a manually actuated, latching or non-latching input device, positioned within immediate reach of the user. Upon activation, the emergency stop switch 35 effects an instantaneous and complete interruption of electrical power supply to the motorized hinge 30 and all motive components of the smart stretching apparatus 1. This thereby arrests all device functions and movement, irrespective of the current operational state.

According to some embodiments, the lever arm 20 is a long, narrow beam that is configured to house electrical components of the smart stretching apparatus 1. The lever arm 20 can be made of any durable material, including aluminum or carbon fiber, and supports the user's legs for lower body stretches, or hands during upper body stretches. In some embodiments, the lever arm 20 has hinge joints 21 which can incorporate a spring-loaded button, or cam-locking lever to allow the lever arm 20 to fold for easy storage. Additionally, in some embodiments, the lever arm can contain at least one set of integrated handlebars 22 which extend outwardly from the lever arm 20. The integrated handlebars 22 are configured to be securely mounted within vertical guide rails 23, which extend alongside a right side and a left side of the lever arm 20. Additionally, the integrated handlebars 22 are actuated by the mobile device 200, changing the position along the lever arm 20 upon command.

The smart stretching apparatus 1 can have a plurality of sensors including an angle sensor 40, force sensor 50, and a strain gauge 60. The angle sensor 40 is an electric sensor which can be positioned within the motorized hinge 30 and can measure the real-time angle of the lever arm 20 in relation to the seat 11. The force sensor is an electronic sensor that can be integrated into the surface of the lever arm 20 and can measure the downward force applied by the user to the lever arm 20. This measurement can indicate whether the user has proper form during their stretches. In some embodiments, the strain gauge 60 can be integrated into the motorized hinge 30 and can detect torque or forces generated when a user holds onto any of the integrated handlebars 22. This serves as a "cheat detection" system for all upper body, standing, and kneeling stretches, wherein the smart stretching apparatus can detect whether a user fails to conduct the stretch properly. The strain gauge can be any common strain gauge known in the art, including common types of strain sensors. In some embodiments, the motorized hinge 30 can possess a microcontroller 70 which has Bluetooth capabilities and can gather all the data acquired by the angle sensor 40, the force sensor 50, and the strain gauge 60. Additionally, the microcontroller can operate with two-way communication by transmitting sensor data to the mobile application 200 on the user's smartphone and receiving control signals from the mobile application 200 to steer the motorized hinge 30.

According to some embodiments, a power connector 80 can extend from a power input port on the lever arm 20. The power connector 80 can provide the necessary electrical power to all electronic components in the smart stretching apparatus 1.

Figure 2:
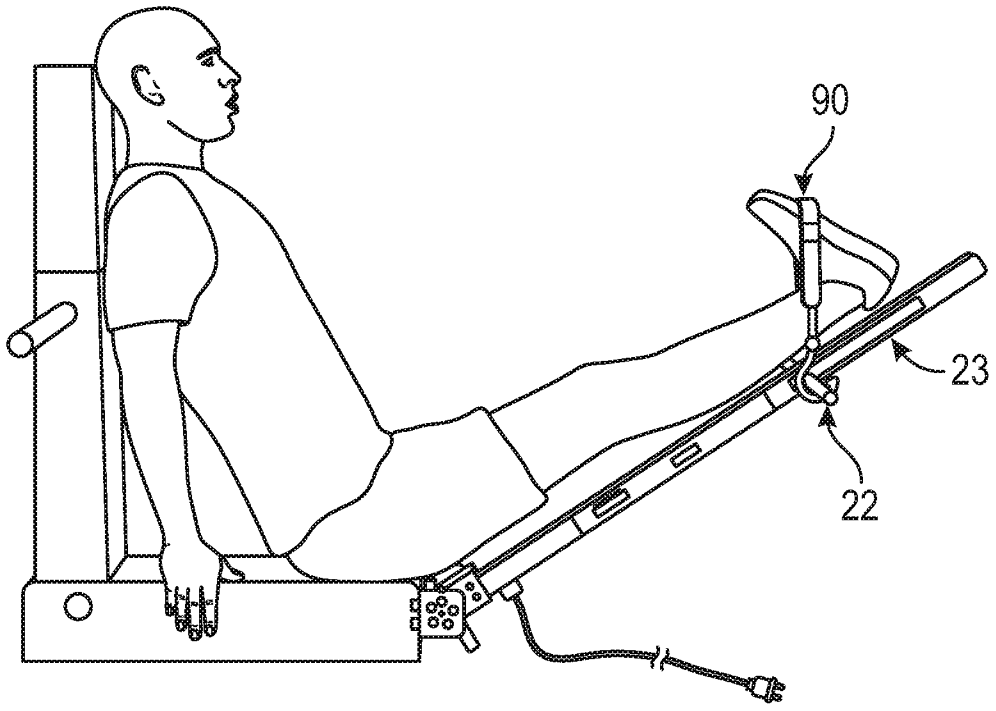
FIG. 2 shows a perspective view of the side of the smart stretching apparatus, in accordance with a method for using an embodiment of the present disclosure.
Figure 3:
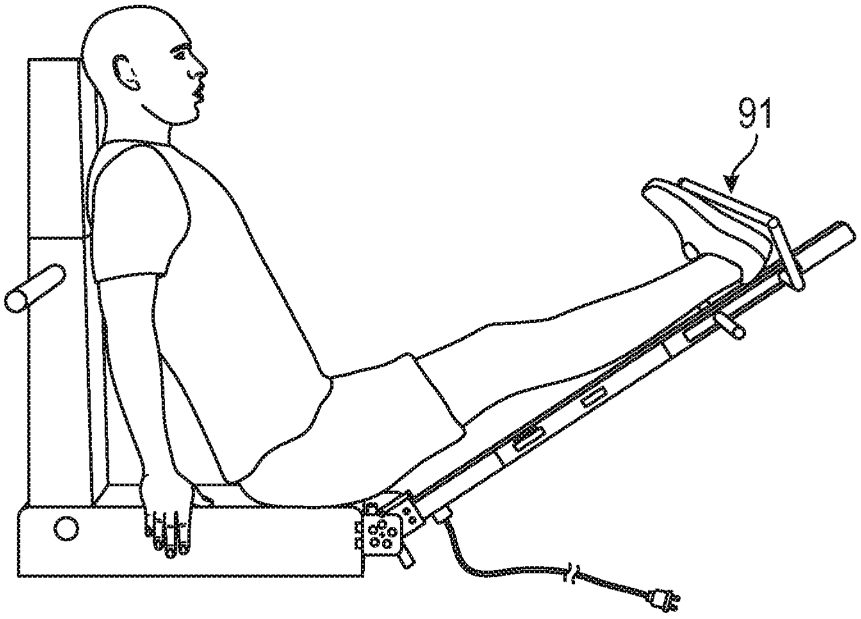
FIG. 3 shows a perspective view of the side of the smart stretching apparatus, in accordance with a method for using an embodiment of the present disclosure.

FIGS. 2-3 show a perspective view of the side of the smart stretching apparatus, in accordance with a method for using an embodiment of the present disclosure. The lever arm 20 is compatible with detachable foot dorsiflexion tools including a foot strap 90 or a foot bar 91. In some embodiments, the foot strap 90 can be a webbing loop used for hamstring stretches or can have an additional mechanism which hooks around the integrated handlebars 22. This includes a hook, clip, or additional loop. The foot strap 90 can be fixed to one of the integrated handlebars 22, ensuring proper dorsiflexion. In alternative embodiments, a foot bar 91 can be securely mounted in the vertical guide rails 23, wherein the positioning can be adjusted along the vertical guide rails 23 as commanded by the mobile application 200. The user can push the sole of either foot against the foot bar 91 to ensure proper dorsiflexion when stretching their hamstring. One of ordinary skill in the art would appreciate that while the foot strap 90 or a foot bar 91 can be implemented into any of the embodiments presented, neither the foot strap 90 or the foot bar 91 is required.

According to some methods for using the smart stretching apparatus 1, a user can stretch their hamstring by sitting on the seat 11 with their back pressed against the backrest 13 and plugging in the power connector 80 to an outlet. The user selects the hamstring stretch on the mobile application 200. The user then places the sole of their foot on the foot bar 91. In alternative methods, the user secures the foot strap 90 on one of the integrated handlebars 22 and places their foot within the foot strap 90. For example, if the user wishes to stretch their right hamstring, then the user places the foot strap 90 on an integrated handlebar 22 on the right side of the lever arm 20. Once the user has the sole of their foot pressed against the foot bar 91, or within the foot strap 90, the user then can use their mobile application to command the motorized hinge 30 through the microcontroller 70 to adjust the position of the lever arm 20. Following the commands of the mobile application 200, the motorized hinge 30 can rotate the lever arm 200 around its hinge either towards the user or away from the user. While the motorized hinge 30 is adjusting the position of the lever arm 20, the angle sensor 40 signals the microcontroller 70 the real-time angle of the lever arm 20, and the force sensor 50 signals the downward force applied by the user. The microcontroller 70 then communicates the angle of the lever arm 20 to the mobile application 200. The user can command the mobile application 200 to make further adjustments to the position of the lever arm 20 or can command the motorized hinge to lock the lever arm 20 at its current position. Further, if the lever arm 20 is rotated too closely to the user, then the user can hit the emergency stop switch 35 to halt all motion of the smart stretching apparatus.

Figure 4:
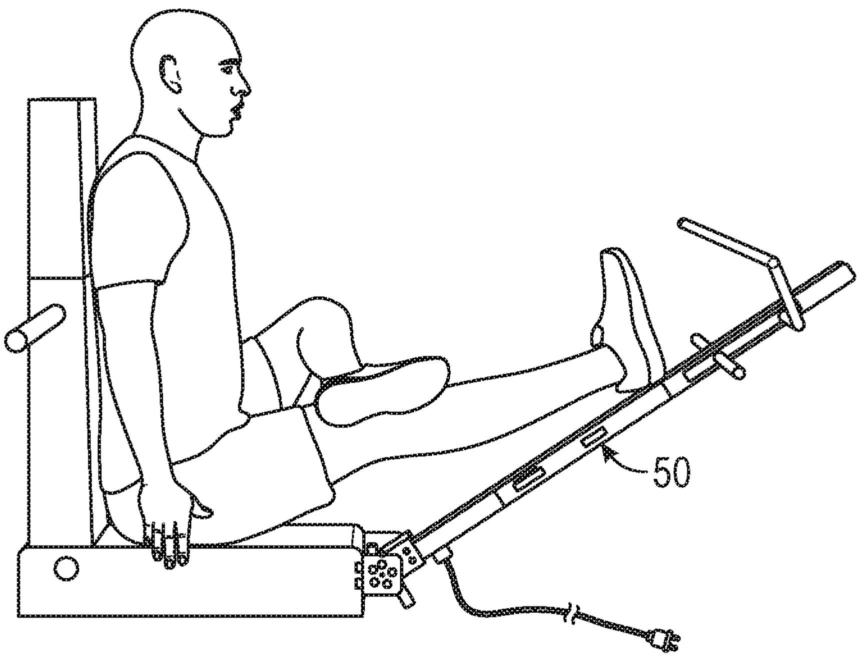
FIG. 4 shows a perspective view of the side of the smart stretching apparatus, in accordance with a method for using an embodiment of the present disclosure.

FIG. 4 shows a perspective view of the side of the smart stretching apparatus, in accordance with a method for using an embodiment of the present disclosure. A user can stretch their glute muscles, hip flexors and hamstrings by sitting on the seat 11 with their back placed against the backrest 13 and plugging in the power connector 80 to an outlet. The user then extends one of their heels onto the lever arm 20 while resting the calf of their other leg on the knee of their extended leg. The mobile application 200 is then used to command the motor hinge 30 to rotate the lever arm 20 towards the user. The angle sensor 40 signals the microcontroller 70 the angle of the lever arm 20 and the force sensor 50 signals the force applied to the lever arm 20. The microcontroller 70 then communicates the data to the mobile application 200. Upon receiving the data from the microcontroller 70, the mobile application can command the motorized hinge to make further adjustments to the angle of the lever arm 20. Adjustments include rotating the lever arm upwards towards the user, or downwards and away from the user.

Figure 5:
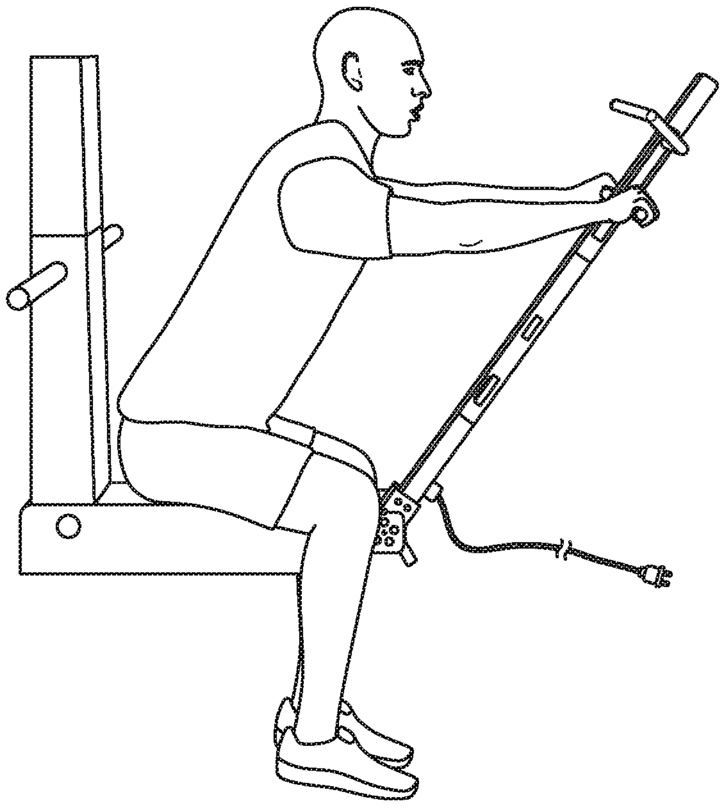
FIG. 5 shows a perspective view of the side of the smart stretching apparatus, in accordance with a method for using an embodiment of the present disclosure.

FIG. 5 shows a perspective view of the side of the smart stretching apparatus, in accordance with a method for using an embodiment of the present disclosure. A user can stretch their back by sitting on the seat 11 while leaning forwards towards the lever arm 20. The user then uses the mobile application on their mobile device to position the lever arm to the first angle as directed by the mobile application. The user places their hands on the integrated handlebars 22. In some embodiments, the lever arm 20 can automatically adjust to encourage deeper stretching. The mobile application signals the microcontroller 70 to engage the motorized hinge 30, rotating the lever arm 20 away from the backrest 13. The mobile application 200 can then record the measurements as provided by the angle sensor 40 and the strain gauge 60. The angle sensor 40 communicates the real-time angle of the lever arm 20, and the strain gauge 60 communicates the pulling or pushing force applied by the user to the integrated handlebars 22. In accordance with alternative embodiments, the integrated handlebars 22 can automatically adjust by slidable translation along the vertical guiderails 23 to encourage deeper stretching. One of ordinary skill in the art would appreciate that automatic adjustment of the integrated handlebars 22 and the lever arm 20 can be implemented in all embodiments, however is not required.

Figure 6:
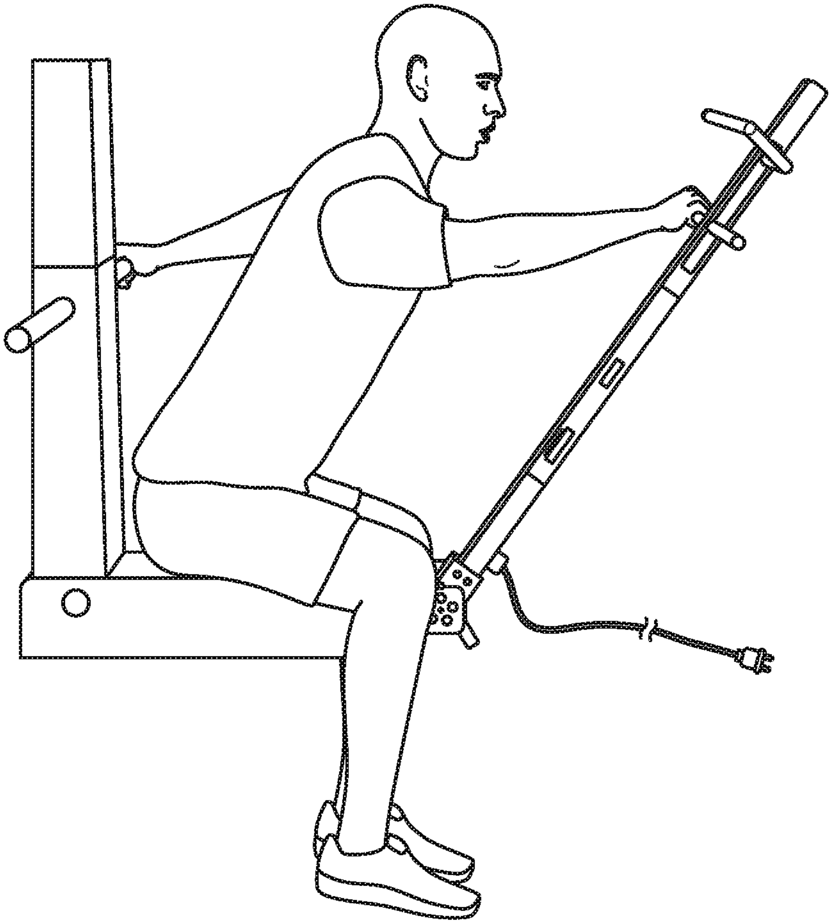
FIG. 6 shows a perspective view of the side of the smart stretching apparatus, in accordance with a method for using an embodiment of the present disclosure.

FIG. 6 shows a perspective view of the side of the smart stretching apparatus, in accordance with a method for using an embodiment of the present disclosure. A user can stretch their back by sitting on the seat 11 while leaning forwards towards the lever arm 20. The user uses the mobile application 200 on their mobile device to position the lever arm to the first angle as directed by the mobile application 200. The user then places one of their hands on the integrated handlebars 22, while the other hand holds one of the grips 15. The angle sensor 40 signals the microcontroller 70 the real-time angle of the lever arm 20, and the strain gauge 60 signals the pulling or pushing force applied by the user to the integrated handlebars 22. The mobile application signals the microcontroller 70 to engage the motorized hinge 30, rotating the lever arm 20 away from the backrest 13. The mobile application 200 can then record the measurements as provided by the angle sensor 40 and the strain gauge 60.

Figure 7:
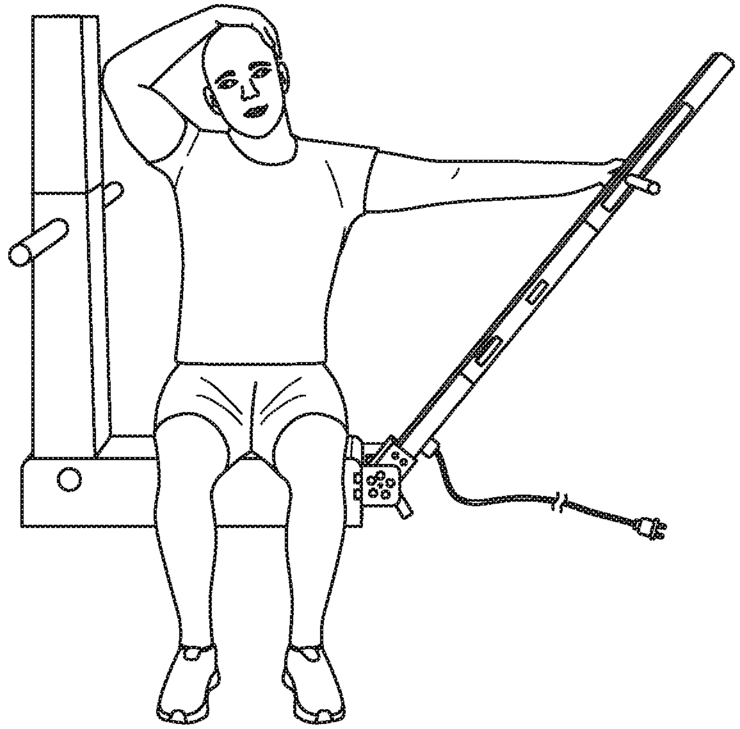
FIG. 7 shows a perspective view of the side of the smart stretching apparatus, in accordance with a method for using an embodiment of the present disclosure.

FIG. 7 shows a perspective view of the side of the smart stretching apparatus, in accordance with a method for using an embodiment of the present disclosure. A user can stretch their neck by sitting on the seat 11 with the backrest 13 either to their right or left side. To stretch the right side of their neck, the user sits on the seat 11 with the backrest 13 to their left side. Alternatively, to stretch the left side of their neck, the user sits on the seat 11 with the backrest 13 to their right side. The user then commands the motorized hinge 30 to adjust the lever arm 20 to the proper starting position via the mobile application 200 on their mobile device. While tilting their head towards the backrest 13, the user places their arm closest to the backrest 13 on top of their head. Their opposing arm then extends to hold one of the integrated handlebars 22. As the user then leans away from the lever arm 20 and towards the backrest 13. The mobile application signals the microcontroller 70 to engage the motorized hinge 30, rotating the lever arm 20 away from the backrest 13. The angle sensor 40 signals the microcontroller 70 the real-time angle of the lever arm 20, and the strain gauge 60 signals the pulling force applied by the user to the integrated handlebars 22. The mobile application 200 can then record the measurements as provided by the angle sensor 40 and the strain gauge 60.

FIGS. 8A-8E show a perspective view of the side of the smart stretching apparatus, in accordance with a method for using an embodiment of the present disclosure. A user can stretch their chest, back, and neck by sitting on the seat 11 with the backrest 13 either to their right or left side. The user then commands the motorized hinge 30 to adjust the lever arm 20 to the proper position via the mobile application 200 on their mobile device.

Figure 8A:
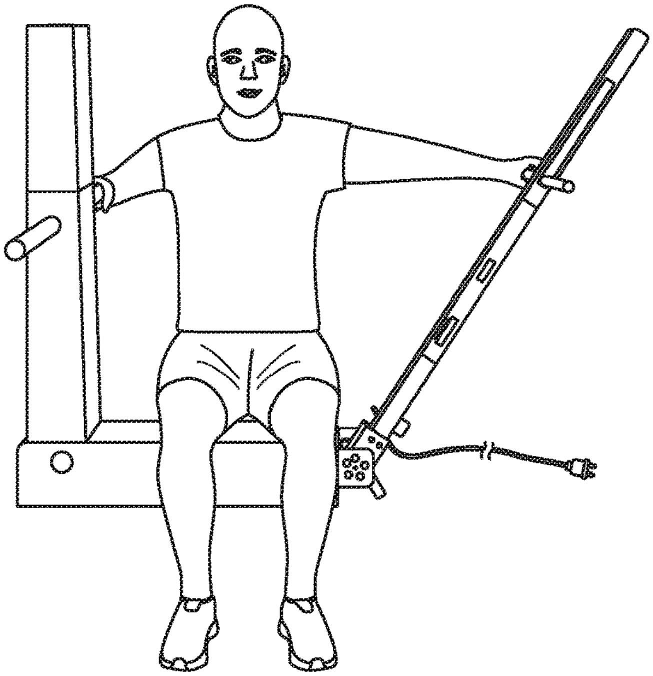
FIG. 8A-8E show a perspective view of the side of the smart stretching apparatus, in accordance with a method for using an embodiment of the present disclosure.

As shown in FIG. 8A, according to some methods for using the smart stretching apparatus 1, a user can stretch their chest by sitting on the seat 11 with the backrest 13 either to their right or left side plugging in the power connector 80 to an outlet. The user then uses the mobile application on their mobile device to position the lever arm to the angle as directed by the mobile application 200. The user rests one of their arms on the integrated handlebars 22, while resting their other arm above one of the grips 15. Alternatively, the user can hold the integrated handlebar 22 and the grip 15. The user then leans forwards. The angle sensor 40 signals the microcontroller 70 the real-time angle of the lever arm 20, and the strain gauge 60 signals the pulling force applied by the user to the integrated handlebars 22. The mobile application signals the microcontroller 70 to engage the motorized hinge 30, rotating the lever arm 20 away from the backrest 13. The mobile application 200 can then record the measurements as provided by the angle sensor 40 and the strain gauge 60.

Figure 8B:
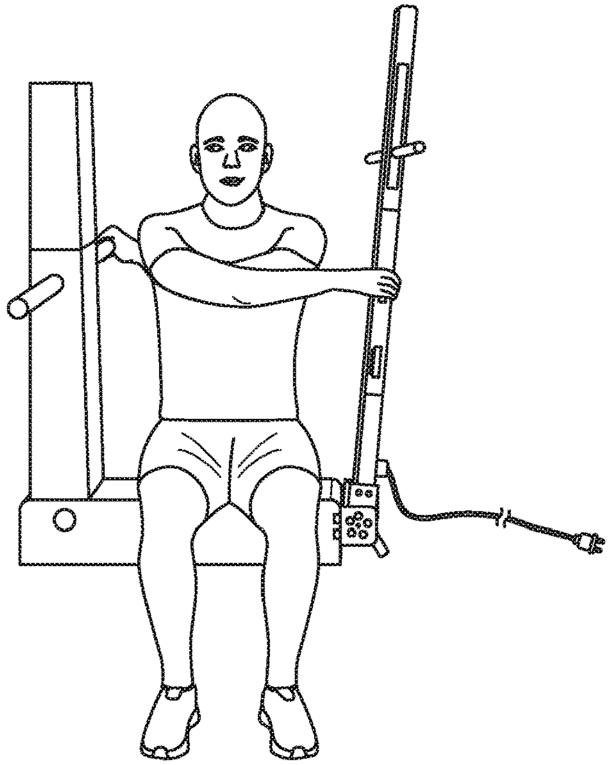

As shown in FIG. 8B, the user can cross their arms and hold the lever arm and a grip 15. The angle sensor 40 then signals the microcontroller 70 the angle of the lever arm 20 and the force sensor 50 signals the force applied to the lever arm 20. In response to the data collected from the angle sensor 40 and the force sensor 50, the mobile application 200 can then command the motorized hinge 30 to rotate the lever arm 20 away from or towards the user for a deeper stretch and form correction.

Figure 8C:
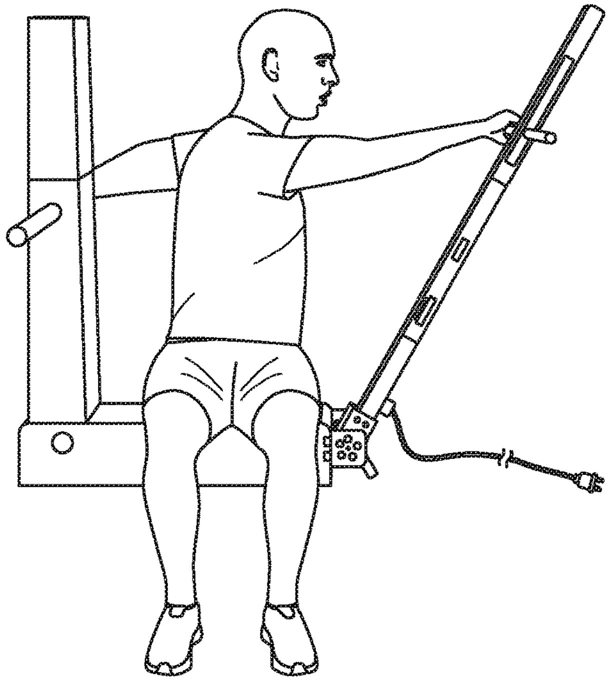

As shown in FIG. 8C, the user can twist their upper body towards the lever arm 20 and hold an integrated handlebar 22 with one hand and the grip 15 with their other hand. When the user is seated with the backrest 13 to their right side, the user holds the integrated handlebar 22 with their right hand and the grip 15 with their left hand. Alternatively, when the user is seated with the backrest 13 to their left side, the user holds the integrated handlebar 22 with their left hand and the grip 15 with their right hand. The angle sensor 40 signals the microcontroller 70 the real-time angle of the lever arm 20, and the strain gauge 60 signals the pulling force applied by the user to the integrated handlebars 22. In response to the data collected from the angle sensor 40 and the force sensor 50, the mobile application 200 can then command the motorized hinge 30 to rotate the lever arm 20 away from the user for a deeper stretch or towards the user to correct the user's form.

Figure 8D:
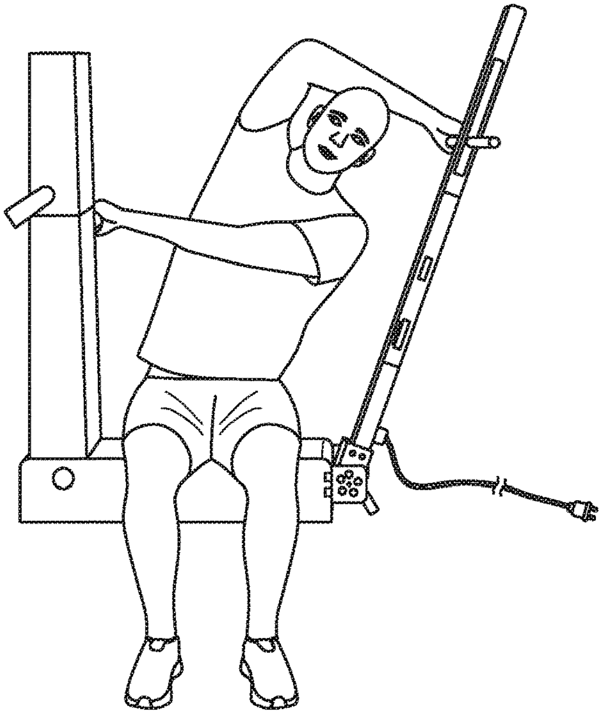

As shown in FIG. 8D, the user can extend their arm above their head and hold an integrated handlebar 22 with one hand and extend their opposing arm across their chest to hold the grip 15 with their other hand. When the user is seated with the backrest 13 to their right side, the user holds the integrated handlebar 22 with their right hand and the grip 15 with their left hand. Alternatively, when the user is seated with the backrest 13 to their left side, the user holds the integrated handlebar 22 with their left hand and the grip 15 with their right hand. The angle sensor 40 signals the microcontroller 70 the real-time angle of the lever arm 20, and the strain gauge 60 signals the pulling force applied by the user to the integrated handlebars 22. In response to the data collected from the angle sensor 40 and the force sensor 50, the mobile application 200 can then command the motorized hinge 30 to rotate the lever arm 20 away from or towards the user for a deeper stretch or towards the user to correct form.

Figure 8E:
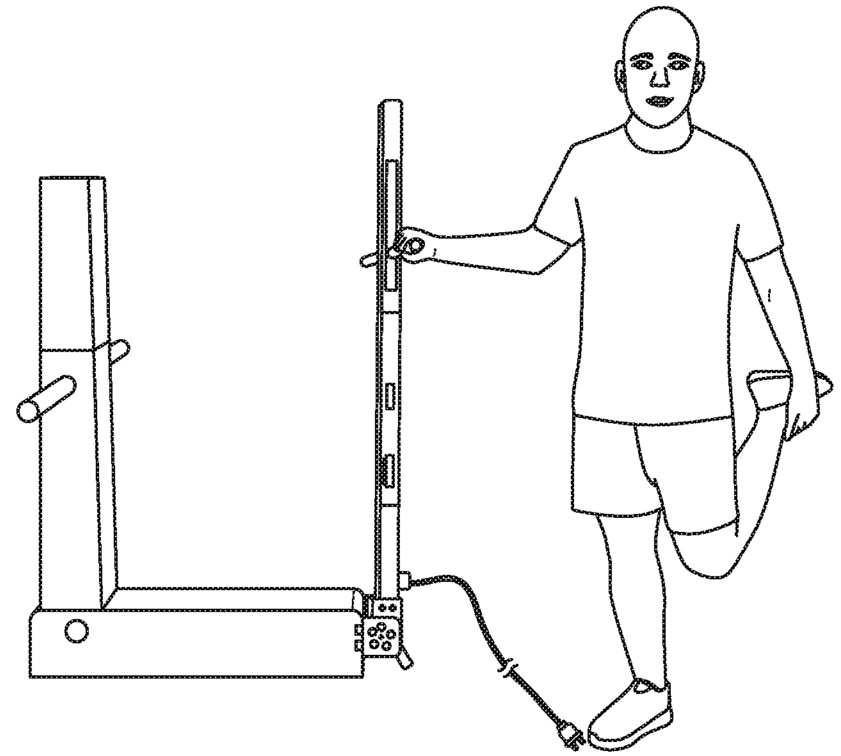

As shown in FIG. 8E, the user can stretch their quadriceps by simply holding the integrated handlebar 22 on the lever arm 20 when in a vertical position. The strain gauge 60 signals the pushing force applied by the user to the integrated handlebars 22. The mobile application 200 can then record the force applied.

Figure 9:
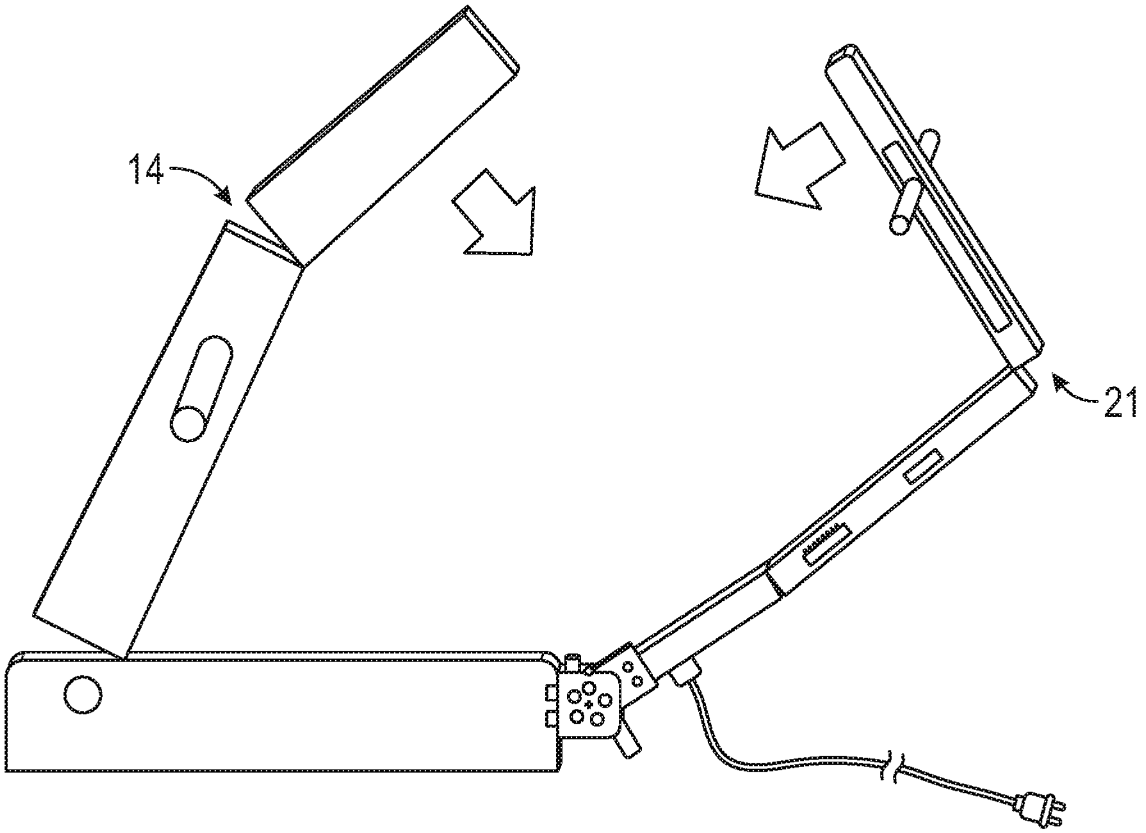
FIG. 9 shows a perspective view of the side of the smart stretching apparatus, in accordance with an embodiment of the present disclosure.
Figure 9:
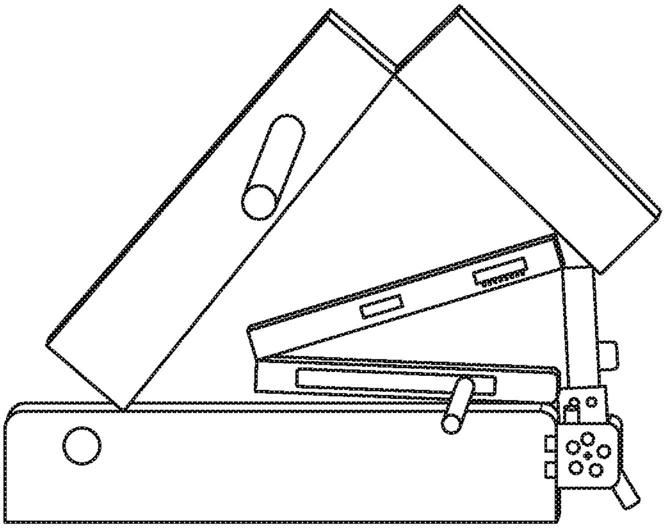

FIG. 9 shows a perspective view of the side of the smart stretching apparatus, in accordance with an embodiment of the present disclosure. The smart stretching apparatus 1, can be folded to make the apparatus more compact for storage. The locking mechanism in the hinge joints 11 can be released, allowing the backrest 13 to be folded. In some embodiments, the backrest 13 is folded inwards towards the lever arm 20. The motorized hinge 30 positions the lever arm 20 at a vertical 90-degree angle, and the locking mechanism in the hinge joints 21 in the lever arm 20 are released, so the lever arm 20 can be folded inwards towards the backrest 13.

Figure 10:
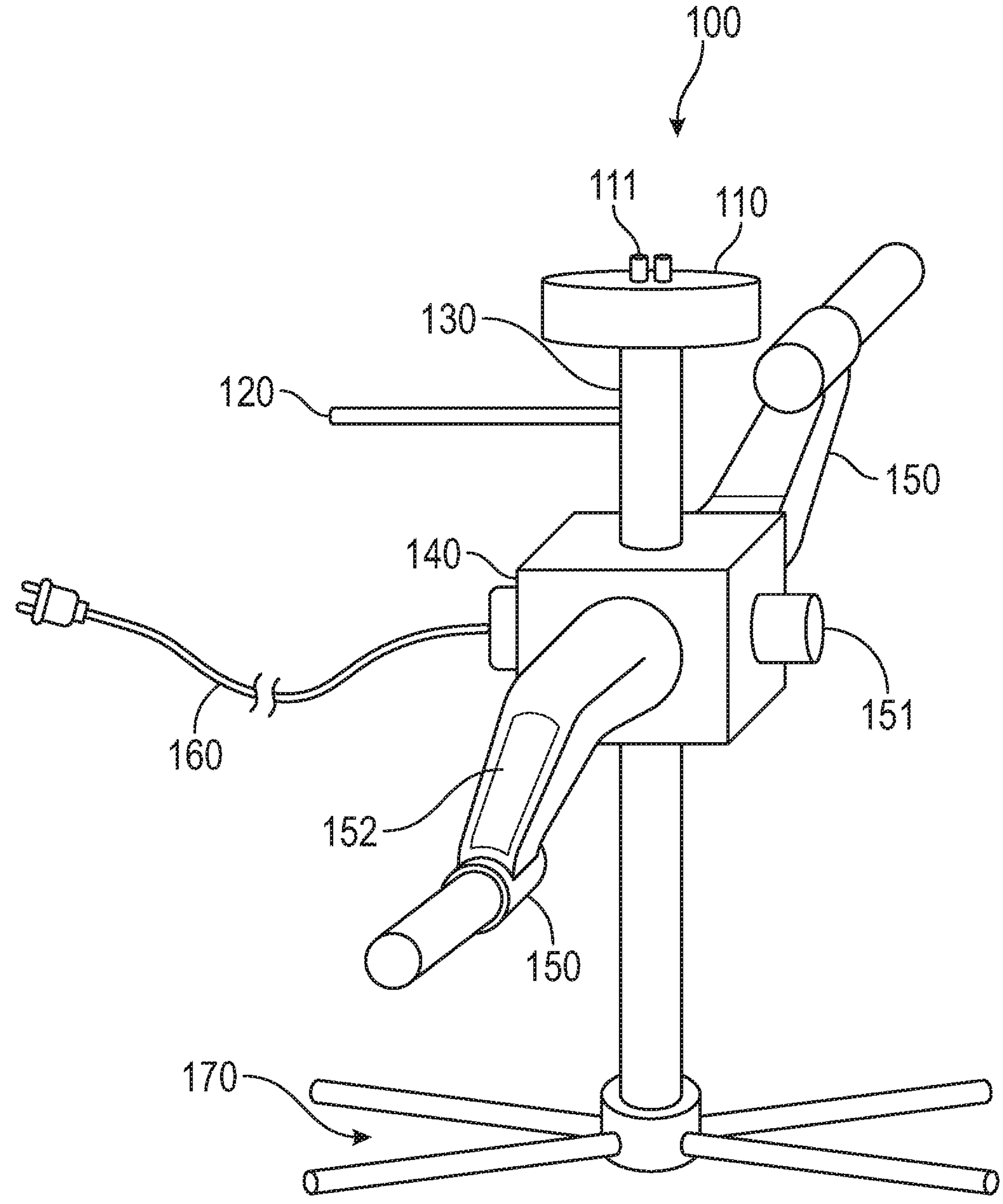
FIG. 10 shows a perspective view of the side of the smart stretching apparatus, in accordance with an embodiment of the present disclosure.

FIG. 10 shows a perspective view of the side of the smart stretching apparatus, in accordance with an embodiment of the present disclosure. The smart stretching apparatus 1, can be used as a standalone chair rather than being placed on a couch or other flat surface. For example, the smart stretching apparatus 1 can be placed on a seat base 100 resembling the base of an office chair.

The seat base 100 enables the user to perform stretches such as a hip flexor stretch or a wide legged split stretch. In some embodiments, the seat base 100 has a height control lever 120, which can adjust the seat's height by controlling a pneumatic cylinder 130. The pneumatic cylinder 130 can contain compressed gas and responds to height control lever 120 by allowing gas to be added or released, causing the chair to move up or down. The seat base 100 can further possess a pedestal base 170 comprised of a plurality of radially extending support legs. The support legs can each terminated by a caster assembly, which permits 360-degree swivel and is fitted with two wheels on a common axle to provide stable, omni-directional mobility for the chair system. One of ordinary skill in the art would appreciate that the height control lever 120 can be implemented in any embodiment of the seat base 100, however is not required.

The seat base 100 can have an electric motor 140 possessing bi-directional control and speed regulation, commanded by the mobile application 200. The electric motor 140 can be any electric motor common in the art. In a preferred embodiment, the electric motor 140 has gears, wherein the gear ratio is precisely engineered to produce high torque necessary for controlled movement while maintaining a low, safe operational speed (e.g., 5 RPM), mitigating the risk of user injury. The electric motor 140 can have a power connector 160, which provides connection to an external power cable and wall adapter, delivering the necessary electrical power to the electric motor 140.

The electric motor 140 powers and turns two crank assemblies 150, each having a horizontally oriented extension bar, which extend from two sides of the electric motor 140. The crank assemblies 150 enable the execution of two primary assisted stretching protocols including a hip flexor stretch and a wide-legged split stretch. The crank assemblies 150 can have a strain gauge 152 to measure the force applied to the crank assemblies by a user. This measurement is communicated to the mobile application 200. According to some embodiments, the crank assemblies 150 employ a double-throw crankshaft configuration, comprising a central drive shaft for each side, mechanically linked to the electric motor 140, and a large, horizontally oriented extension bar (or foot cradle) that defines the radius of rotation. The goal of the crank assemblies 150 is to maximize mechanical stability and ensure consistent, large-diameter circular motion. To ensure the user's safety while using the smart stretching device 1, an integrated current limiting circuitry is designed to monitor and immediately halt all rotational movement upon detecting an excessive load or user resistance. Additionally, the electric motor 140 can have a hard-wired emergency stop switch 151 which allows the user to immediately interrupt all machine movement at any time.

Figure 11:
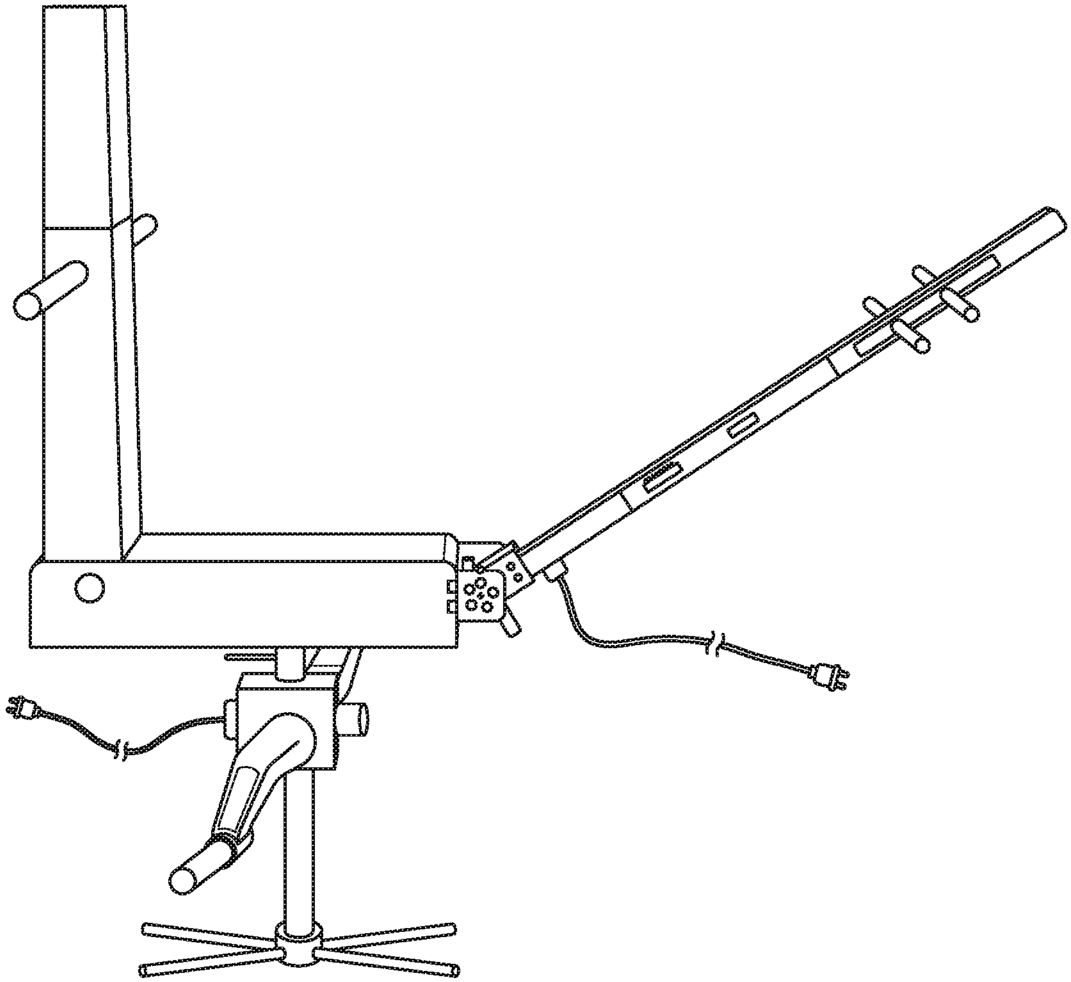
FIG. 11 shows a perspective view of the side of the smart stretching apparatus, in accordance with an embodiment of the present disclosure.

FIG. 11 shows a perspective view of the side of the smart stretching apparatus, in accordance with an embodiment of the present disclosure. The seat base 100 can be secured to the main body 10 through a base bracket 110 with a lock mechanism which complements a bracket mechanism 104 adjoined to the bottom surface of the seat 11 of the main body 10. The seat base 100 can have a quick-connect electrical coupling interface 111, comprising a plug component which allows the seat base 100 to be connected to a socket component. This interface ensures the simultaneous mechanical joining and conductive electrical connectivity of internal electronic components when the main body 10 is placed on the seat base 100. Specifically, facilitating the transmission of power, control signals, and data between the combined assemblies.

Figure 12:
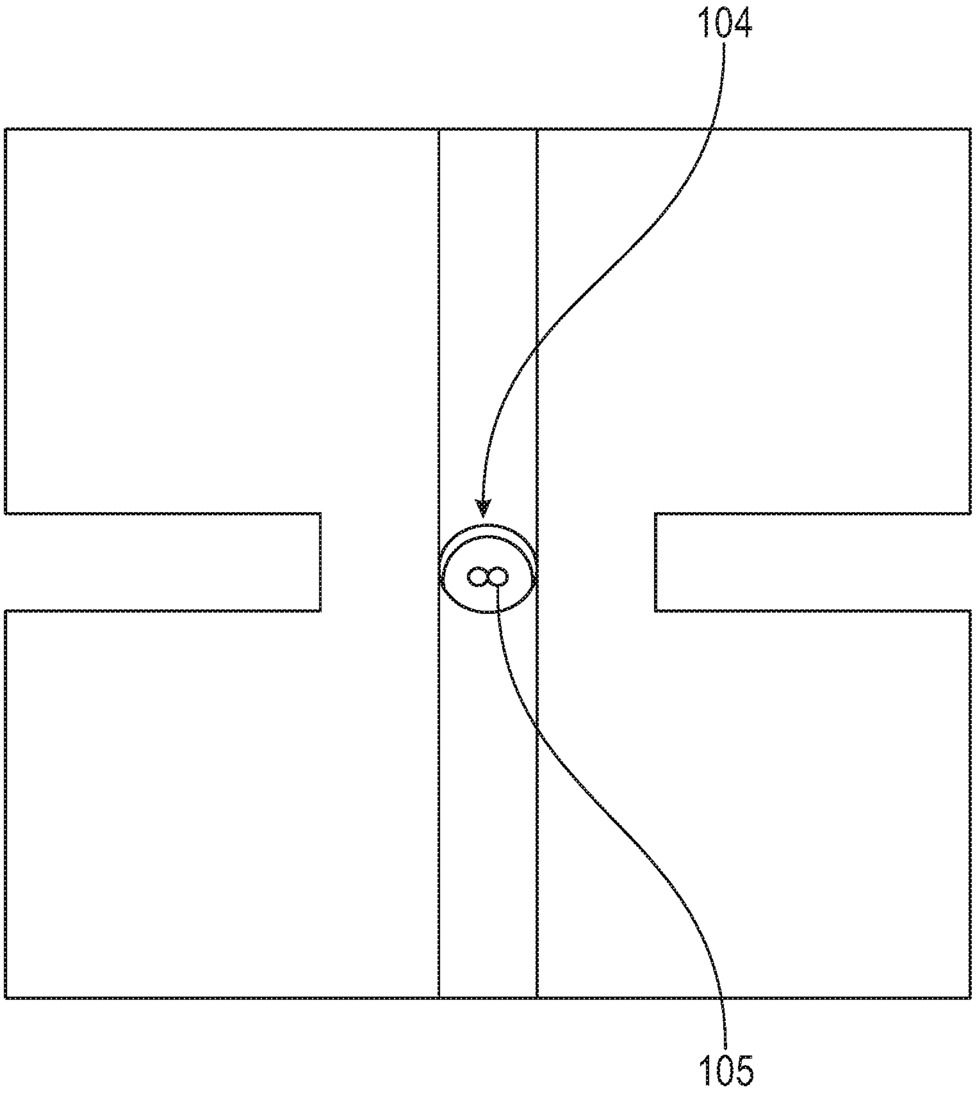
FIG. 12 shows a bottom view of the seat of the smart stretching apparatus, in accordance with an embodiment of the present disclosure.

FIG. 12 shows a bottom view of the seat of the smart stretching apparatus, in accordance with an embodiment of the present disclosure. The bracket mechanism 104 on the bottom surface of the seat can incorporate a quick-connect electrical coupling interface 105, comprising a plug component which allows the seat 11 to be connected to a socket component. The bracket mechanism 104 and the quick-connect electrical coupling interface 105 complement the base bracket 110, securing the main body 10 to the seat base 100.

Figure 13:
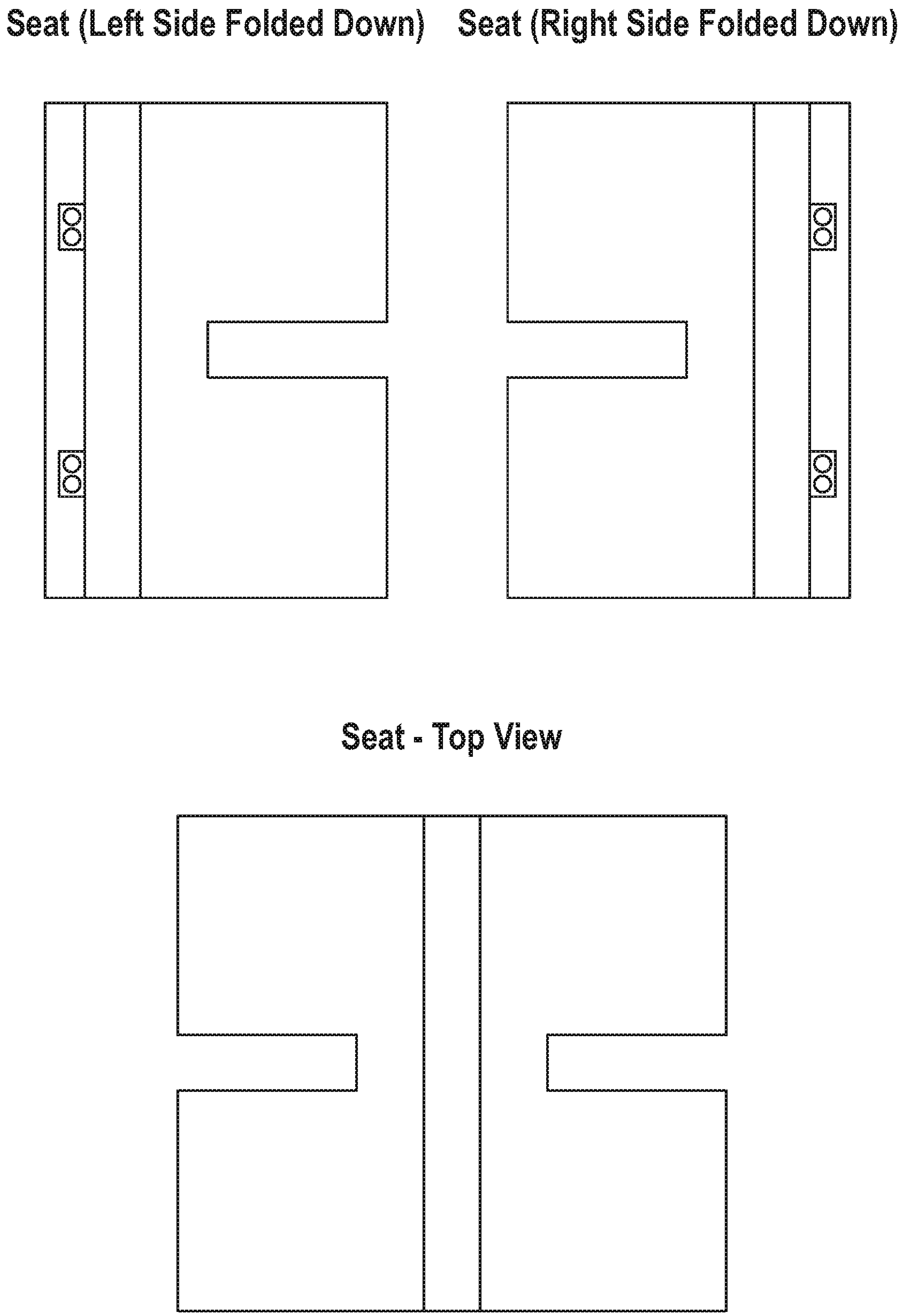
FIG. 13 shows a top view, a right side, and left side view of the seat of the smart stretching apparatus, in accordance with an embodiment of the present disclosure.
Figure 14:
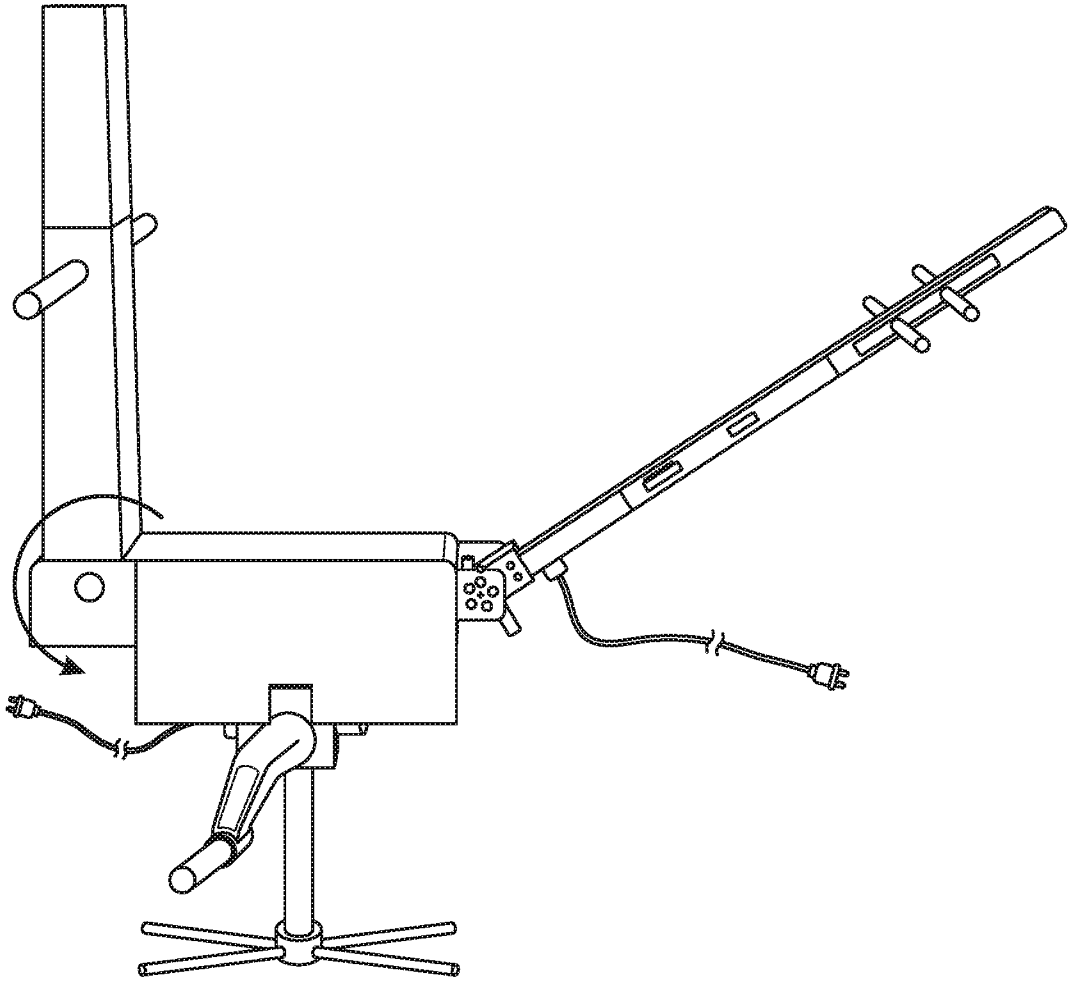
FIG. 14 shows a perspective view of the side of the smart stretching apparatus, in accordance with an embodiment of the present disclosure.

FIG. 13 shows a top view, a right view, and a left view of the seat of the smart stretching apparatus, in accordance with an embodiment of the present disclosure. The seat 11 can have folds extending from a back edge, adjoined to the backrest 13, towards a front edge, adjoined to the motorized hinge 30. Further, a right edge and a left edge of the seat 11 can have a depressed edge, allowing the seat to avoid the horizontally oriented extension bars on the crank assemblies 150 when folded downwards. The right edge and the left edge can be folded downwards towards the seat base 100 independent of one another, or synchronously. Further, FIG. 14 shows a perspective view of the side of the smart stretching apparatus, in accordance with an embodiment of the present disclosure. When either the right or left edge of the seat 11 is folded downwards towards the seat base 100, the depressed edge is positioned above the crank assemblies 150, enabling the horizontally oriented extension bars to rotate upwards without hinderance.

Figure 15:
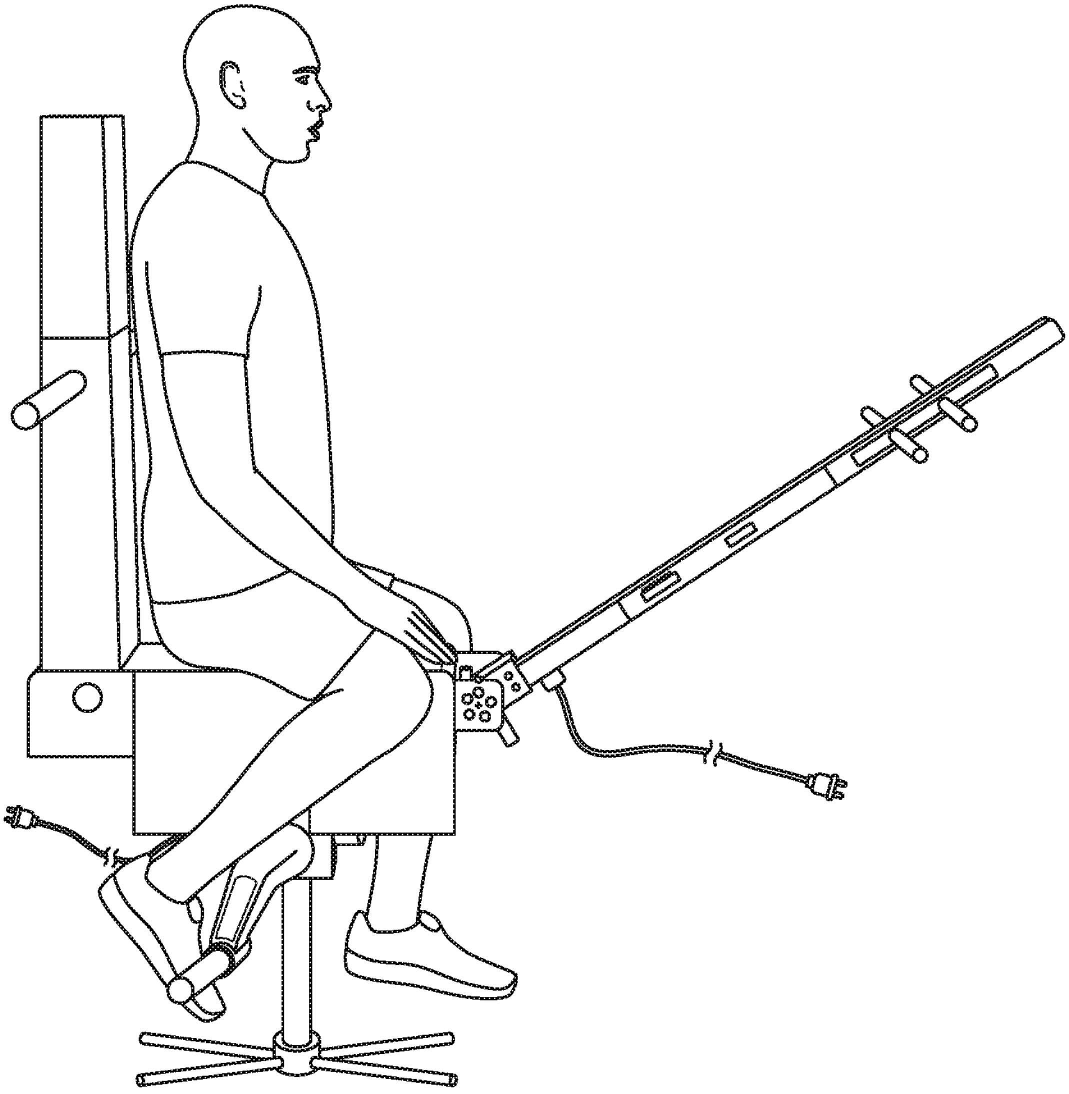
FIG. 15 shows a perspective view of the side of the smart stretching apparatus, in accordance with a method for using an embodiment of the present disclosure.

FIG. 15 shows a perspective view of the smart stretching apparatus, in accordance with a method for using an embodiment of the present disclosure. A user can stretch their hip flexor by first sitting on the seat 11 with their back pressed against the backrest 13 and plugging in the power connector 80 to an outlet. The user can fold either the left edge, the right edge, or both the right and the left edges of the seat 11 downwards towards the seat base 100. The crank assemblies 150 begin with the horizontally oriented extension bars at the lowest vertical position and the user places their foot on one extension bar of one crank assembly 150. The electric motor 140 drives the crank assembly 150 clockwise to rotate the user's leg backward toward the rear of the unit, creating a progressive, dynamic stretch on the user's hip flexor muscles. The strain gauge 152 signals the mobile application 200 of the force applied to the crank assembly 150, and the mobile application 200 commands the crank assemblies 150 to adjust as needed.

Figure 16:
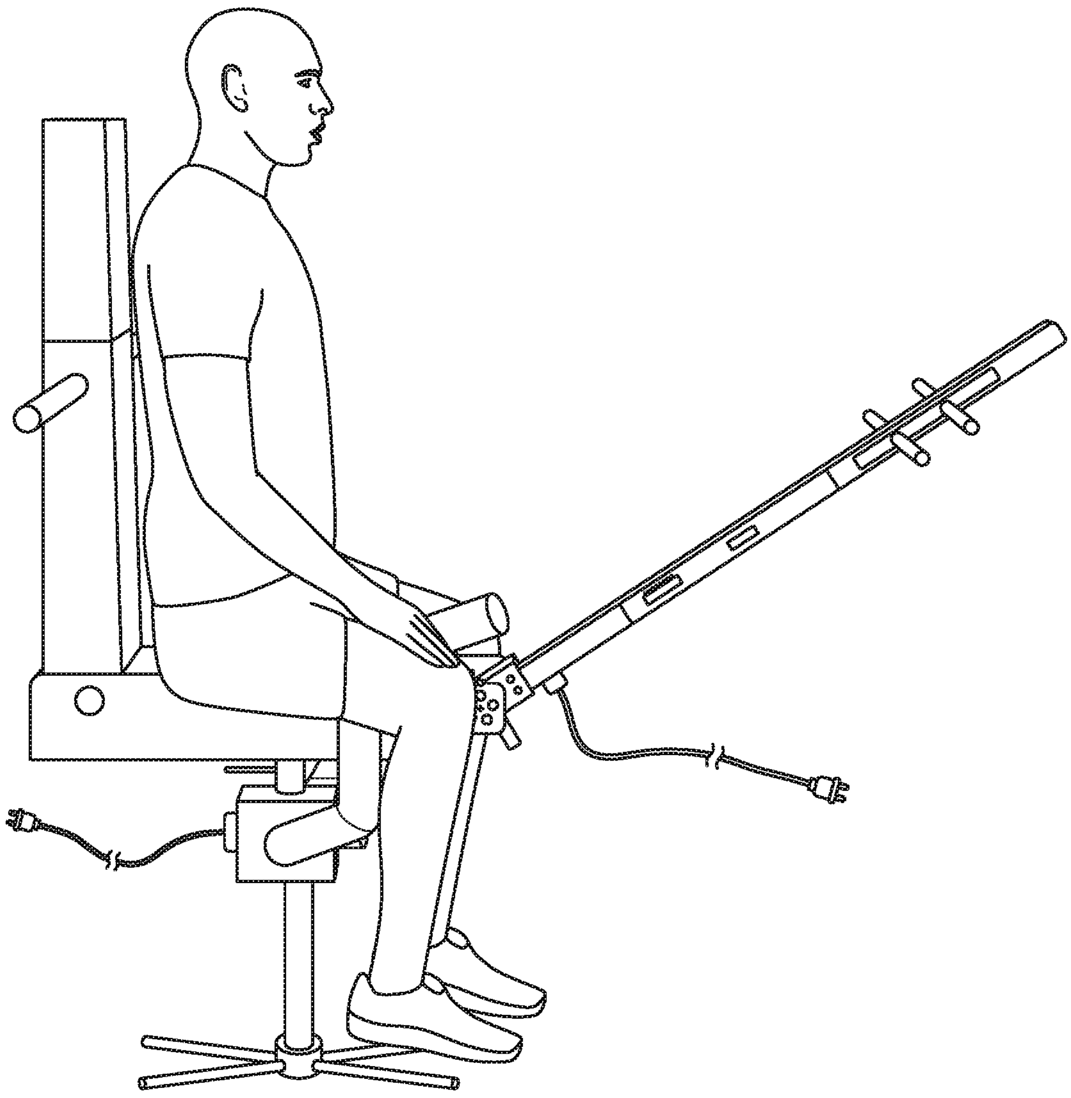
FIG. 16 shows a perspective view of the side of the smart stretching apparatus, in accordance with a method for using an embodiment of the present disclosure.
Figure 17:
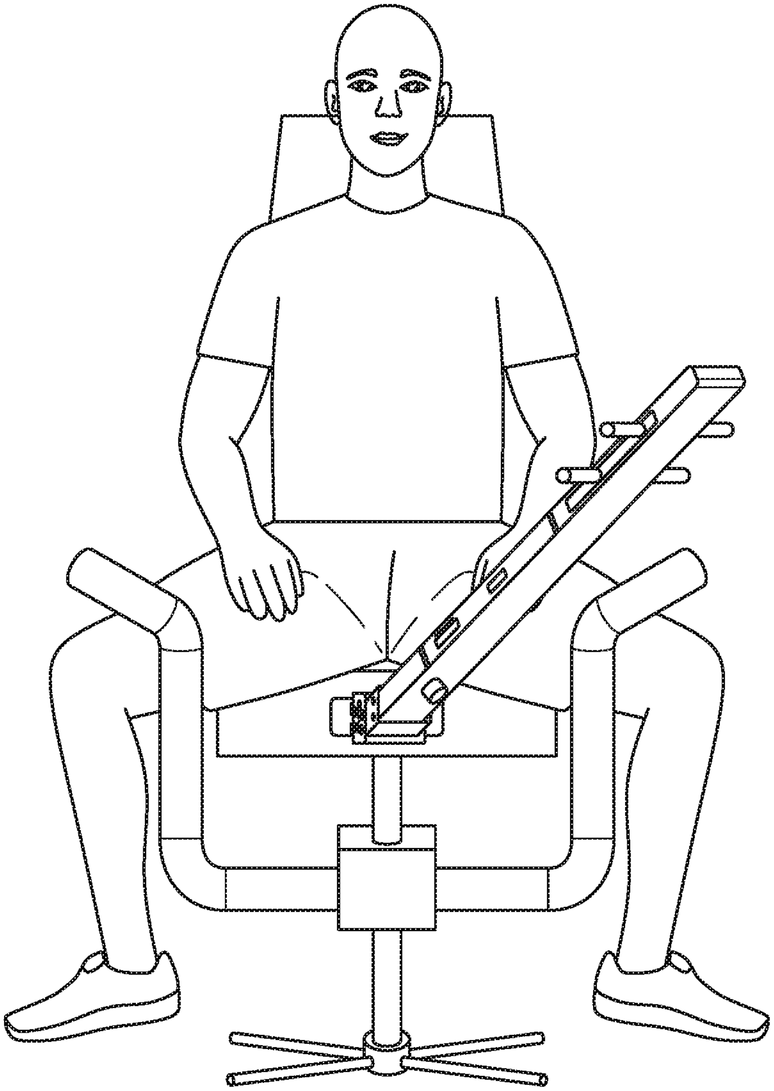
FIG. 17 shows a perspective view of the front of the smart stretching apparatus, in accordance with a method for using an embodiment of the present disclosure.

FIGS. 16-17 show a perspective view of the smart stretching apparatus, in accordance with method for using an embodiment of the present disclosure. A user can stretch their inner thigh and hamstrings in a wide leg split stretch by first sitting on the seat 11 with their back pressed against the backrest 13 and plugging in the power connector 80 to an outlet. The crank assemblies 150 move synchronously wherein both crank assemblies 150 begin in a forward, horizontal position. The user assumes a wide-legged stance, and the crank assemblies 150 rotate the horizontally oriented extension bars upwards and counterclockwise from their starting position towards the user. Once the crank assemblies 150 reach the upper arc of the rotation, the extension bars apply a slow, controlled pushing force against the user's upper legs (proximal to the knee) to assist in a gradual, deep, wide-legged abductor/adductor stretch.

Figure 18:
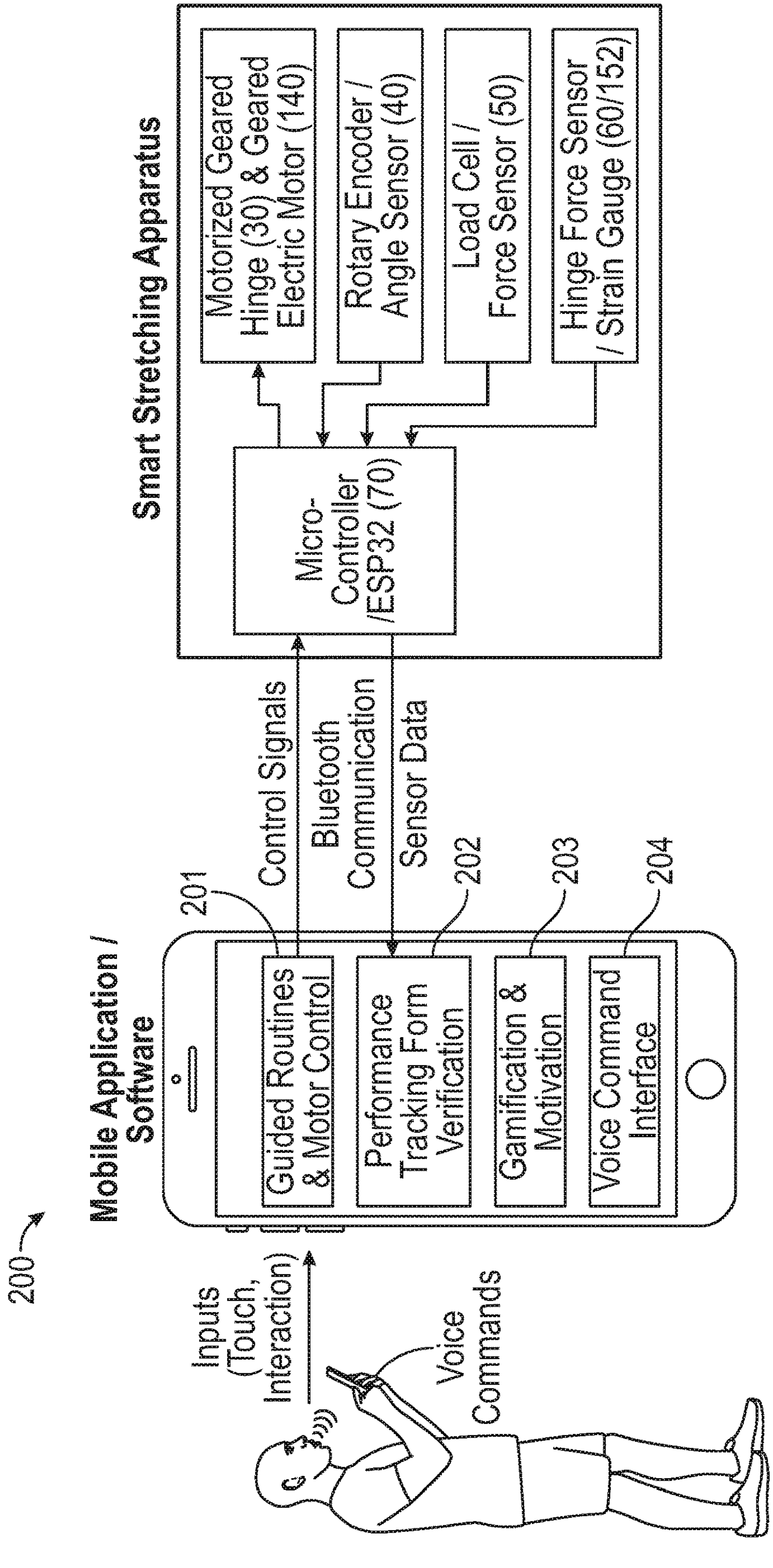
FIG. 18 shows a block diagram of the mobile application in accordance with an embodiment of the present disclosure.

FIG. 18 shows a block diagram of the mobile application in accordance with an embodiment of the present disclosure. The mobile application 200 can be used on any mobile device including a smartphone or tablet and serves as the primary user interface and control center for the apparatus. The mobile application 200 can send control signals to the motorized hinge 30 to automatically position the lever arm 20 and to the electric motor 140 to automatically position the crank assembly 150. The mobile application 200 can position the lever arm 20 and the crank assemblies 150 according to pre-programmed stretching sequences. The lever arm 20 is repositioned for lower body stretches including the combined hamstring/calf stretch and the glute stretch. Additionally, the lever arm 20 can be moved downwards to create tension for upper body stretches targeting the upper back, shoulders, neck, side body, and spinal twist.

The mobile application 200 can guide the user through various pre-programmed stretches stored in an automated routine guidance module 201. In some embodiments, the guided stretches can be performed without movement of the lever arm 20, such as a chest opener stretch, and stretches can be performed off the main seat including the standing quadriceps stretch. The mobile application 200 can instruct the user to perform bilateral upper body stretching sequences on one side, then turn the apparatus 180 degrees and repeat on the other side. For the hip flexor stretch and the wide-legged split stretch, the mobile application 200 commands the crank assemblies 150 to rotate the horizontally oriented extension bars synchronously or asynchronously upwards towards the user.

The mobile application 200 can also track performance and verify the user's form in a performance tracking and form verification module 202. The mobile application 200 actively receives and processes input data from the angle sensor 40, force sensor 50, and a strain gauge 60. Once the data is received from any one of the sensors, the performance tracking and form verification module 202 verifies that the user is properly engaging with the apparatus as per the pre-programmed instructions for each stretch. This functions as a "cheat detection" and effort-tracking mechanism. During stretches, the angle sensor 40 tracks the achieved range of motion while using the lever arm 20 for real-time feedback and long-term progress tracking. Further, the performance tracking and form verification module 202 can use the combined sensor data to calculate the successful completion of each exercise within the guided routine.

In some embodiments, the mobile application 200 can gamify the stretches and can monitor progress of the user through a gamification and progress monitoring module 203. The gamification and progress monitoring module 203 can enable the mobile application to visually display progress of the user over time, track personal bests, and feature a competitive leaderboard with other users or friends to encourage consistent use.

In some embodiments, the mobile application 200 has a voice command interface 204, which enables the mobile application 200 to receive voice commands. This allows for a hands-free user experience. A user who is in a stretch position can give voice commands to the voice command interface 204 which are related to the routine. When the voice command interface 204 recognizes a voice command, the mobile application 200 signals the motorized hinge 30, or the electric motor 140 to either begin movement, stop movement, or adjust positioning of the lever arm 20 or crank assemblies 150. For example, the user can say "go" or "I'm ready" to begin a stretch, "stop" to pause the stretch, "more stretch" and "less stretch" to command the motorized hinge 30 or the electric motor 140 to make real-time adjustments. In some embodiments, this functionality may be implemented using a third-party voice AI platform (e.g., the Soundhound platform) or similar technology.

Further, the mobile application 200 can possess an expanded content library [205]. The expanded content library is configured to provide a storage of additional, non-machine-assisted stretches (e.g., cat-cow on the sofa) that the user can perform facultatively to further enhance their stretching routines. Upon completing the non-machine-assisted stretches, the user can create an entire stretching ecosystem centered around the main device.

One having ordinary skill in the art would appreciate that while the gamification and progress monitoring module 203, the voice command interface 204, and the expanded content library, can be implemented in any embodiment of the mobile application 200, each module is not required.

Numerous embodiments will be apparent in light of the present disclosure, and features described herein can be combined in any number of configurations.

What is claimed is:

1. A smart stretching apparatus, comprised of:

a main body, having a seat and a backrest, wherein a back surface of the seat and a back surface of the backrest are flat;

wherein the backrest is further comprised of at least one set of grips, each grip of the at least one set of grips extending from a respective right side and a left side of the backrest;

a lever arm extending from a motorized hinge, wherein the lever arm is detachable and is further comprised of:

at least one set of integrated handlebars secured to a vertical guide rail;

a force sensor for measuring a downward force applied to the lever arm by a user;

a microcontroller for gathering data from the force sensor; and a power connector for obtaining power from a power source;

the motorized hinge adjoined to a front edge of the seat, the motorized hinge further comprised of:

an angle sensor for measuring an angle of the lever arm;

a strain gauge for detecting a force applied to the at least one set of integrated handlebars by the user; and a mobile application configured to communicate and control the motorized hinge.

2. The smart stretching apparatus of claim 1, wherein the smart stretching apparatus is configured to be placed on a couch, or another soft surface without damaging a material of the couch or another soft surface.

3. The smart stretching apparatus of claim 1, wherein the main body further comprises:

a backrest sliding mechanism on the seat, including a spring-loaded pull pin and a track; and wherein the seat is adjoined to the backrest by a hinge joint with a locking mechanism.

4. The smart stretching apparatus of claim 1, further comprising a bracket mechanism adjoined to the back surface of the seat.

5. The smart stretching apparatus of claim 1, wherein the at least one set of integrated handlebars can change position along the vertical guide rail.

6. The smart stretching apparatus of claim 1, wherein the lever arm further comprises:

a securing means which can secure a detachable foot strap or a detachable foot bar; and at least one hinge joint with a locking mechanism.

7. The smart stretching apparatus of claim 3, wherein a seat base can be secured to a bracket mechanism.

8. The smart stretching apparatus of claim 1, wherein the microcontroller communicates data gathered from the force sensor to the mobile application.

9. The smart stretching apparatus of claim 1, wherein the mobile application for controlling the smart stretching apparatus further comprises:

an automated routine guidance module, for sending control signals to the motorized hinge, and an electric motor in the smart stretching apparatus, wherein when a control signal is received by the smart stretching apparatus, the motorized hinge repositions the lever arm, and the electric motor repositions at least one crank assembly;

a performance tracking and form verification module, for receiving and processing input data from the force sensor, the angle sensor, and the strain gauge on the smart stretching apparatus;

a gamification module and progress module, for visually displaying the user's progress over time;

a voice command interface, enabling the mobile application to accept a voice command from the user; and an expanded content library, for providing users with non-machine assisted stretches.

10. A smart stretching apparatus, comprising:

a main body, having a seat and a backrest, wherein a back surface of the seat is adjoined to a bracket mechanism;

wherein the seat is adjoined to the backrest by a hinge joint with a locking mechanism;

wherein the backrest is further comprised of at least one set of grips, each grip of the at least one set of grips extending from a respective right side and a left side of the backrest;

a lever arm extending from a motorized hinge, wherein the lever arm is detachable and is further comprised of:

at least one hinge joint with a locking mechanism;

at least one set of integrated handlebars secured to a vertical guide rail;

a force sensor for measuring a downward force applied to the lever arm by a user;

a microcontroller for gathering data from the force sensor; and a power connector for obtaining power from a power source;

the motorized hinge adjoined to a front edge of the seat, the motorized hinge further comprised of:

an angle sensor for measuring an angle of the lever arm;

a strain gauge for detecting a force applied to the at least one set of integrated handlebars by the user;

a detachable seat base comprising:

a bracket wherein the bracket can be secured to the bracket mechanism adhered to the seat;

a height control lever for adjusting a height of the seat;

at least one crank assembly with a hinge force sensor;

an electric motor for powering the at least one crank assembly;

a power plug; and a pedestal base; and a mobile application configured to communicate and control the motorized hinge, and the electric motor.

11. The smart stretching apparatus of claim 10, wherein the height control lever further comprises a pneumatic cylinder.

12. The smart stretching apparatus of claim 10, wherein the electric motor has at least one gear with a gear ratio that produces a high torque and a low operational speed.

13. The smart stretching apparatus of claim 10, wherein the at least one crank assembly has a double-throw crankshaft configuration, comprising a central drive shaft, mechanically linked to the electric motor, and a horizontally oriented extension bar that defines a radius of rotation.

14. The smart stretching apparatus of claim 10, wherein the mobile application for controlling the smart stretching apparatus further comprises:

an automated routine guidance module, for sending control signals to the motorized hinge, and the electric motor in the smart stretching apparatus, wherein when a control signal is received by the smart stretching apparatus, the motorized hinge repositions the lever arm, and the electric motor repositions at least one crank assembly of the at least one crank assembly;

a performance tracking and form verification module, for receiving and processing input data from the force sensor, the angle sensor, and the strain gauge on the smart stretching apparatus;

a gamification module and progress module, for visually displaying the user's progress over time;

a voice command interface, enabling the mobile application to accept a voice command from the user; and an expanded content library, for providing users with non-machine assisted stretches.

15. A method for using a smart stretching apparatus, the method comprising:

sitting on a seat and powering on the smart stretching apparatus by plugging in a power connector;

selecting a stretch to be completed on a mobile application;

commanding, by the mobile application, a motor hinge to reposition a lever arm into a starting position;

positioning, by a user, their body on the smart stretching apparatus according to an instruction on the mobile application;

measuring, by an angle sensor, an angle position of the lever arm;

measuring, by a force sensor, a force applied to the lever arm by the user;

communicating, by a microcontroller in the lever arm, the data from the angle sensor and the force sensor to the mobile application; and commanding, by the mobile application, the motorized hinge to adjust the angle of the lever arm; and repositioning, by the motorized hinge, the lever arm in accordance with the command from the mobile application.

16. The method for using the smart stretching apparatus of claim 15, further repositioning a backrest on the seat by pulling a plug out of the seat and moving the backrest along a track in the seat, and securing the plug back into the seat.

17. The method for using the smart stretching apparatus of claim 15, wherein when the user completes a back stretch, the method further comprises the steps of:

selecting, by the user, a back stretch on the mobile application;

sitting on the seat, facing the lever arm;

holding a plurality of integrated handlebars on the lever arm;

leaning forwards as the lever arm is repositioned by the motorized hinge, as commanded by the mobile application;

recording, by the mobile application, at least one angle adjustment made to the lever arm to deepen the back stretch.

18. The method for using the smart stretching apparatus of claim 15, wherein when the user completes a neck stretch, the method further comprises the steps of:

selecting, by the user, a neck stretch on the mobile application;

sitting on the seat, with the backrest to the right side or the left side of the user, wherein when the user is stretching a right side of their neck, the user sits with the backrest positioned to their left side, and when the user is stretching a left side of their neck, the user sits with the backrest positioned to their right side;

holding, by the user, an integrated handlebar of at least one set of integrated handlebars with either the right hand or the left hand of the user, wherein when the user is stretching the right side of their neck, the user holds the integrated handlebar of at least one set of integrated handlebars with their right hand, and when the user is stretching the left side of their neck, the user holds the integrated handlebar of at least one set of integrated handlebars with their right hand;

leaning, by the user, their head away from the lever arm;

measuring, by the force sensor, a pulling force applied to the at least one set of integrated handlebars by the user;

commanding, by the mobile application, the motorized hinge to rotate the lever arm away from the user to enhance stretching; and measuring, by the angle sensor, at least one change in the angle of the lever arm.

19. The method for using the smart stretching apparatus of claim 15, wherein when the user completes a hip flexor stretch, the method further comprises the steps of:

selecting, by the user, a hip flexor stretch on the mobile application;

folding, by the user, a side edge of the seat downwards, wherein if the user is stretching their right hip flexor, the user will fold down a right side edge of the seat, and if the user is stretching their left hip flexor, the user will fold down a left side edge of the seat;

commanding, by the mobile application, the motorized hinge to position the lever arm on a diagonal angle away from a backrest;

commanding, by the mobile application, an electronic motor on a base seat to position at least one crank assembly to be rotated clockwise until a horizontally oriented extension bar meets a first position of the hip flexor stretch, wherein a top of the user's foot is beneath the horizontally oriented extension bar;

measuring, by a hinge force sensor, a force applied by a user's foot to the horizontally oriented extension bar;

commanding, by the mobile application, the electronic motor to reposition the at least one crank assembly.

20. The method for using the smart stretching apparatus of claim 15, wherein when the user completes a hamstring stretch, the method further comprises the steps of:

selecting, by the user, a hamstring stretch on the mobile application;

sitting on the seat, facing the lever arm with the user's back pressed against a backrest;

extending one of the user's feet over the lever arm, wherein the user places a sole of their foot pressed against a foot bar extending from the lever arm, or the user extends the sole of their foot upwards within a foot strap extending from the lever arm;

measuring, by the angle sensor, at least one change in the angle of the lever arm.

21. The method for using the smart stretching apparatus of claim 15, wherein when the user completes a glute stretch, the method further comprises the steps of:

selecting, by the user, a hamstring stretch on the mobile application;

sitting on the seat, facing the lever arm with the user's back pressed against a backrest;

extending a user's first foot over the lever arm, wherein the user places a sole of the first foot pressed against a foot bar extending from the lever arm, or the user extends the sole of the first foot upwards within a foot strap extending from the lever arm;

crossing, by the user, a second foot across a leg extending from the first foot;

measuring, by the angle sensor, at least one change in the angle of the lever arm.

22. The method for using the smart stretching apparatus of claim 15, wherein when the user completes a wide legged stretch, the method further comprises the steps of:

selecting, by the user, a wide legged split stretch on the mobile application;

sitting on the seat, facing the lever arm with the user's back pressed against a backrest and both legs positioned in a wide leg stance;

commanding, by the mobile application, an electronic motor on a base seat to position a set of crank assemblies to be rotated upwards until a horizontally oriented extension bar meets a first position of the wide legged split stretch, wherein a top of the user's thighs are beneath the horizontally oriented extension bar; measuring, by a hinge force sensor, a force applied by the user's legs to the horizontally oriented extension bar;

commanding, by the mobile application, the electronic motor to reposition the crank assemblies.

* * * * *